Jan. 18, 1949.  H. J. AXTELL  2,459,676
UNIVERSAL COUPLER FOR SUPPORTING CAMERAS ON TRIPODS
Filed Jan. 12, 1948
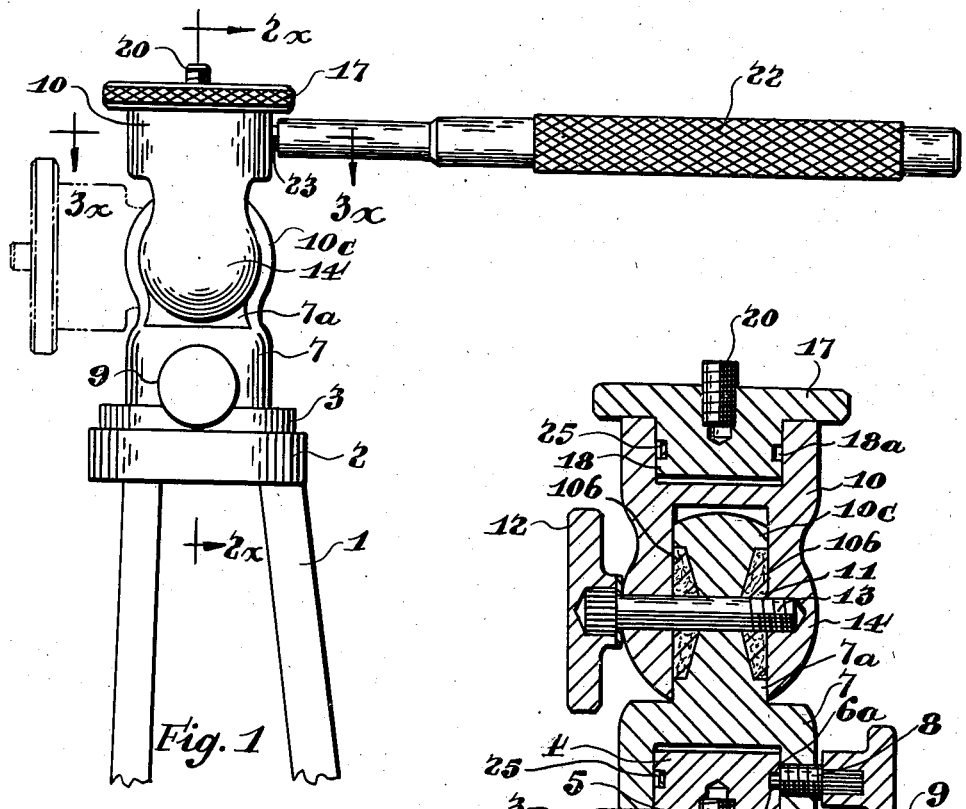
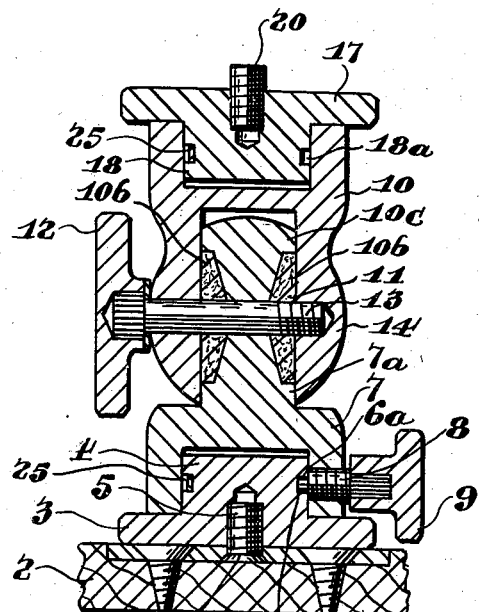
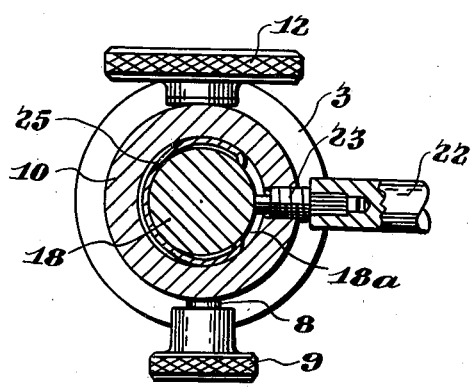
INVENTOR.
Harold J. Axtell
BY
Frank Keifer
atty Patented Jan. 18, 1949

2,459,676

UNITED STATES PATENT OFFICE 2,459,676

UNIVERSAL COUPLER FOR SUPPORTING CAMERAS ON TRIPODS

Harold J. Axtell, Rochester, N. Y.

Application January 12, 1948, Serial No. 1,765

5 Claims. (Cl. 248—177)

Cameras are used for the purpose of taking pictures. For this purpose they are frequently mounted on tripods. When so mounted, they are limited in movement to the plane of the top of the tripod in pointing the camera.

I have invented a coupling or fixture that can be placed between the top of the tripod and the bottom of the camera, which will permit the camera to be turned at most any angle up or down as well as in any direction other than that fixed by the top of the tripod.

Another object of the invention is to hold the camera firmly in any position in which it may finally be placed, and from which position it can be quickly turned to any other position desired and firmly held in the new position.

In the drawings:

Figure 1 is a side elevation of the tripod with the coupling placed on the top thereof.

Figure 2 is a vertical section on the line 2x, 2x of Figure 1 on an enlarged scale.

Figure 3 is a horizontal section on the line 3x, 3x of Figure 1 on an enlarged scale.

In the drawing, reference numeral 1 indicates the tripod, 2 indicates the deck of the tripod on which the coupling is placed, 3 indicates the base of the coupling having a cylindrical top or boss 4 of reduced diameter. The base is bored and threaded from the bottom up on its vertical or central axis as indicated at 5 and a stud 6 is used to fasten the base to the top of the tripod. This stud is ordinarily a part of the tripod.

On the reduced top of the base and forming a part thereof is mounted a pedestal 7 which has a large cylindrical opening in the bottom thereof, which engages with the reduced top of the base on which it can turn freely. The reduced top of the base has an annular slot or groove 6a in its cylindrical surface, which slot or groove is concentric with the vertical axis of the base.

In the bottom of the pedestal is threaded a screw 8 having a horizontal axis, which screw has a knurled head 9 thereon. This screw has a reduced end 8a, which engages with the annular groove 6a and holds the pedestal firmly engaged with the base, permitting it, however, to turn thereon. By turning the screw, the pedestal can be firmly clamped to the base.

The pedestal has an extension 7a on the top thereof, from which extension two segments are cut away to form two parallel male sides. Each of these sides is counterbored as indicated at 10b, leaving an annular rim 10c on the margin of the counterbore.

Engaging with the sides of the extension is a bracket 10 which at the bottom is cut away internally to form two parallel female sides on the inside thereof. These parallel sides on the bracket are somewhat in the form of a fork. These two female sides of the bracket make a sliding engagement with the two male sides on the extension of the pedestal.

The pedestal and one side of the bracket are both perforated centrally to receive the stem 11. The other side of the bracket is provided with a recess which is threaded with a female thread to engage with the male thread formed on the end of the stem. By this stem the pedestal and the bracket are held together so that the bracket can swing on the pedestal. This stem has a large knurled head 12 thereon. This stem on the end is threaded at 13 with the male thread. This male thread engages with the female thread formed in the sides 14 on the bracket. At the top of the bracket is a cup shaped top integral therewith.

Into this cup shaped top is inserted a cap or plug having a circular plate 17 on top and having a reduced end or hub 18 below. This hub has an annular slot or groove 18a therein in its cylindrical surface, which groove is concentric with the vertical axis of the boss. The reduced end 18 engages with the cup shaped opening in the top of the bracket, making a working fit therein. This cap can be turned in any direction on the bracket. In the top of the circular plate is placed a stud 20, which projects above the plate.

In the bottom of every camera is a socket formed with a female thread. This socket and female thread can engage with the male thread on the stud 20 and thereby the camera can be fastened in place on the top of the coupling.

Into the side of the cup shaped top of the bracket is formed a hole with a female thread therein. A handle 22 is provided having a reduced end 23, which is threaded with a male thread and engages with the female threaded opening in the top of the bracket. By giving the handle 22 an extra turn, the reduced end of the handle shown in Figure 3 will engage with the groove 18a in the hub or reduced end 18 of the cap having the circular plate 17. This locks the bracket, the cap and the handle together. By this handle, the bracket can be tilted on the axis through a wide angle on the stem 11 so that the camera can be pointed up or down and can be turned at any angle around the points of the compass on the cylindrical top or boss 4. In this way a universal adjustment of the camera is secured.

When the desired position of the camera is secured, the camera can be fastened securely in place by turning the knurled head 9 which locks it at the bottom and by turning the knurled head 12, which fixes the angle on the horizontal axis and by turning the handle 22, which clamps the top of the coupling to the bracket.

In the annular grooves on the cylindrical parts 4 and 18 a bow spring 25 is inserted under tension which takes up the slack space between the cylindrical extension in each case and the cup shaped recess in which it fits. This makes a frictional engagement between the two parts which holds them together for all practical purposes and prevents the one from being accidentally turned on the other.

As shown by the drawing, the camera can be turned up through an angle of nearly 90° by pulling down on the handle and can be turned down through an angle of about 90° by pulling up on the handle. This gives the lens of the camera a vertical swing of an angle of about 130°. The lens can be given a horizontal swing of 360°. By removing the handle or substituting a very short one, the camera can be turned up through an angle of 90° and turned down through 90° or can be given a total vertical swing of 180°.

I claim:

1. A coupling adapted to connect a camera to a tripod, said coupling having a base plate, a cylindrical boss on top of the base plate, a pedestal having a hollow cylindrical base adapted to engage with the boss and its base, said pedestal having an upward extension having two parallel male sides, a bracket having two parallel female sides extending downwardly therefrom adapted to engage with the male sides of the pedestal, a hole through one of the downwardly extending sides of the bracket, a recess in the other side of the bracket, a hole through the upward extension of the pedestal, a stem having a male thread on the end thereof adapted to pass through one side of the bracket and through the extension of the pedestal and engage with the threaded recess in the other side of the bracket to hold the bracket on the pedestal and permit the bracket to rock on the pedestal, said bracket having a cup shaped recess on top thereof, a cover for said bracket having a plate on top thereof and a hub extension downward therefrom and engaging in said cup shaped recess.

2. A coupling adapted to connect a camera to a tripod, said coupling having a base plate at the bottom with a cylindrical boss extending upwardly therefrom, a cover plate for said coupling having a plate on top thereof and a cylindrical hub extending downward therefrom, means connecting the boss at the bottom with the hub at the top, which means can turn either on the boss or the hub through 360°, said means having a top part and a bottom part and a horizontal axis connecting them in such manner that the top part of the connecting means can turn 90° from its upright position in either direction to a horizontal position.

3. In a coupling for a camera and a tripod, the combination of a pedestal having a post placed upwardly thereon, a member mounted to rock on said pedestal and axis for joining the pedestal and the rocking member, the bottom of the pedestal being cylindrical and being recessed with a recess to receive a cylindrical extension, the top of the rocking member being also recessed to receive a cylindrical extension, a plate having a cylindrical member on the bottom thereof extending down into the recess on top of the rocking member, a base having a second plate having a cylindrical extension extending up into the recess of the pedestal, each of said cylindrical extensions having an annular recess thereon, a set screw in the cylindrical bottom of the pedestal that engages with the cylindrical extension of the base, said cylindrical bottom of the pedestal extending down to the last named plate.

4. In a coupling for a camera and a tripod, the combination of a pedestal having an upright post thereon, said post having parallel sides, rocking member on top of the pedestal having a recess therein, the sides of which are parallel and are adapted to engage the sides of the upright member, a bolt passing centrally and horizontally through both members so that the upper member can rock on the lower member, said bolt being adapted to clamp the upper member in any angular position on the lower member, the bottom of the pedestal being recessed with the cylindrical recess having a vertical axis, a base plate having an upwardly extending cylindrical extension on the top thereof adapted to engage in the cylindrical recess of the pedestal, said extension having an annular recess therein extending around the extension, a set screw mounted on the pedestal and adapted to engage with the upwardly extending cylindrical extension.

5. In a coupling for a camera and a tripod, the combination of a pedestal having an upright post thereon, said post having a recess therein, the sides of which are parallel and are adapted to engage the sides of the upright member, a bolt passing centrally and horizontally through both members so that the upper member can rock on the lower member, said bolt being adapted to clamp the upper member in any angular position on the lower member, the bottom of the pedestal being recessed with the cylindrical recess having a vertical axis, a base plate having an upwardly extending cylindrical extension on the top thereof adapted to engage in the cylindrical recess of the pedestal, said extension having an annular recess therein extending around the extension, a set screw mounted on the pedestal and adapted to engage with the upwardly extending cylindrical extension, a top plate having a cylinder extending downward therefrom adapted to engage in the cylindrical opening in the top of the rocking member, a horizontally extending member threaded into the side of the rocking member and having an extension adapted to engage with the cylinder by which the top plate can be placed in any angular position with reference to the upright axis of the rocking member.

HAROLD J. AXTELL.

REFERENCES CITED

The following references are of record in the file of this patent:

UNITED STATES PATENTS

| Number | Name | Date |
|---|---|---|
| 399,345 | Poehlman | Mar. 12, 1889 |
| 875,034 | Wright | Dec. 31, 1907 |
| 1,776,646 | Wilson | Sept. 23, 1930 |
| 1,919,554 | Howell | July 25, 1933 |
| 2,145,584 | Chamberlain | Jan. 31, 1939 |
| 2,429,803 | Cardona | Oct. 28, 1947 |